(No Model.) 3 Sheets—Sheet 1.
E. N. ZELLER.
COLD TIRE SETTING MACHINE.
No. 585,997. Patented July 6, 1897.
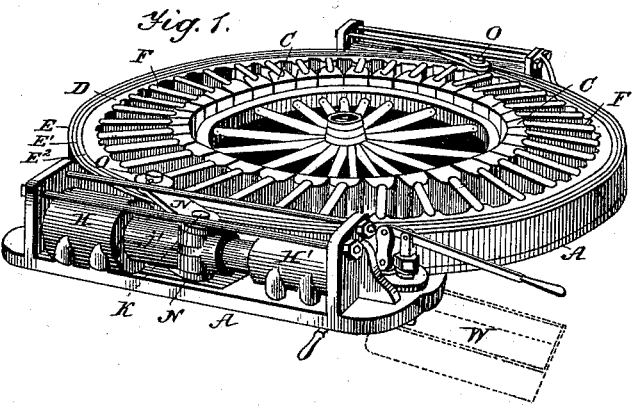
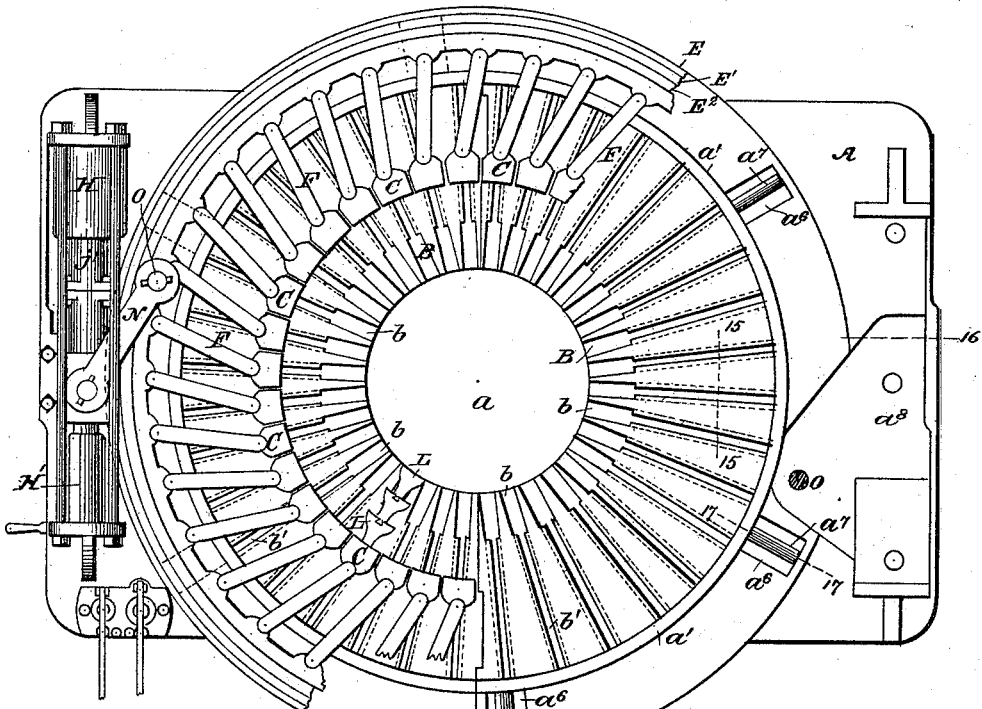
WITNESSES:
J. E. Luckett
Jos. A. Ryan
INVENTOR
Edward N. Zeller
BY
Fred G. Dieterich & Co.
ATTORNEYS (No Model.) 3 Sheets—Sheet 2.
E. N. ZELLER.
COLD TIRE SETTING MACHINE.
No. 585,997. Patented July 6, 1897.
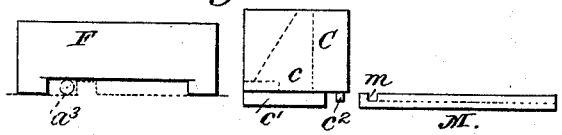
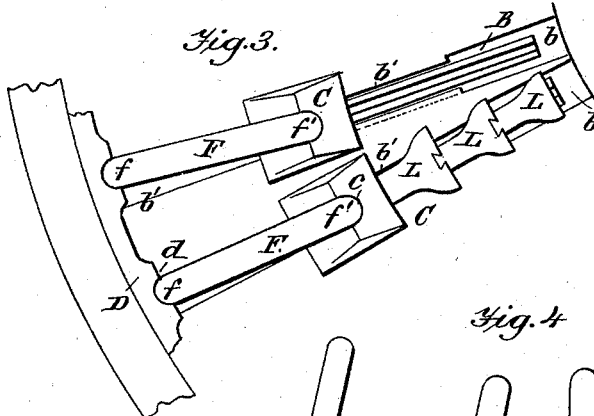
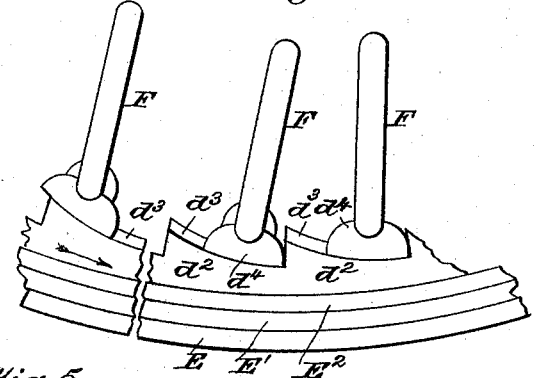
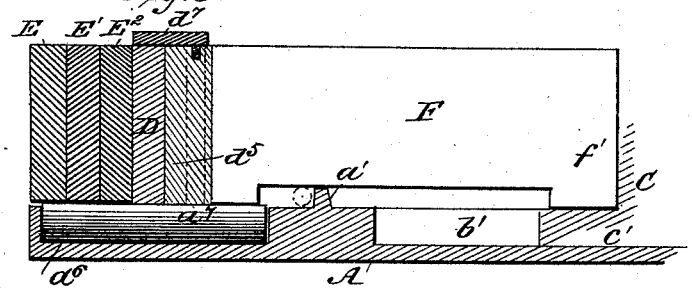
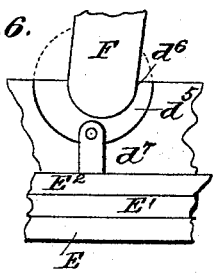
WITNESSES:
J. E. Luckett
Jos. A. Ryan
INVENTOR
Edward N. Zeller
BY
Fred G. Dieterich & Co.
ATTORNEYS
THE NORRIS PETERS CO., PHOTO-LITHO., WASHINGTON, D. C.

(No Model.) 3 Sheets—Sheet 3.
E. N. ZELLER.
COLD TIRE SETTING MACHINE.
No. 585,997. Patented July 6, 1897.
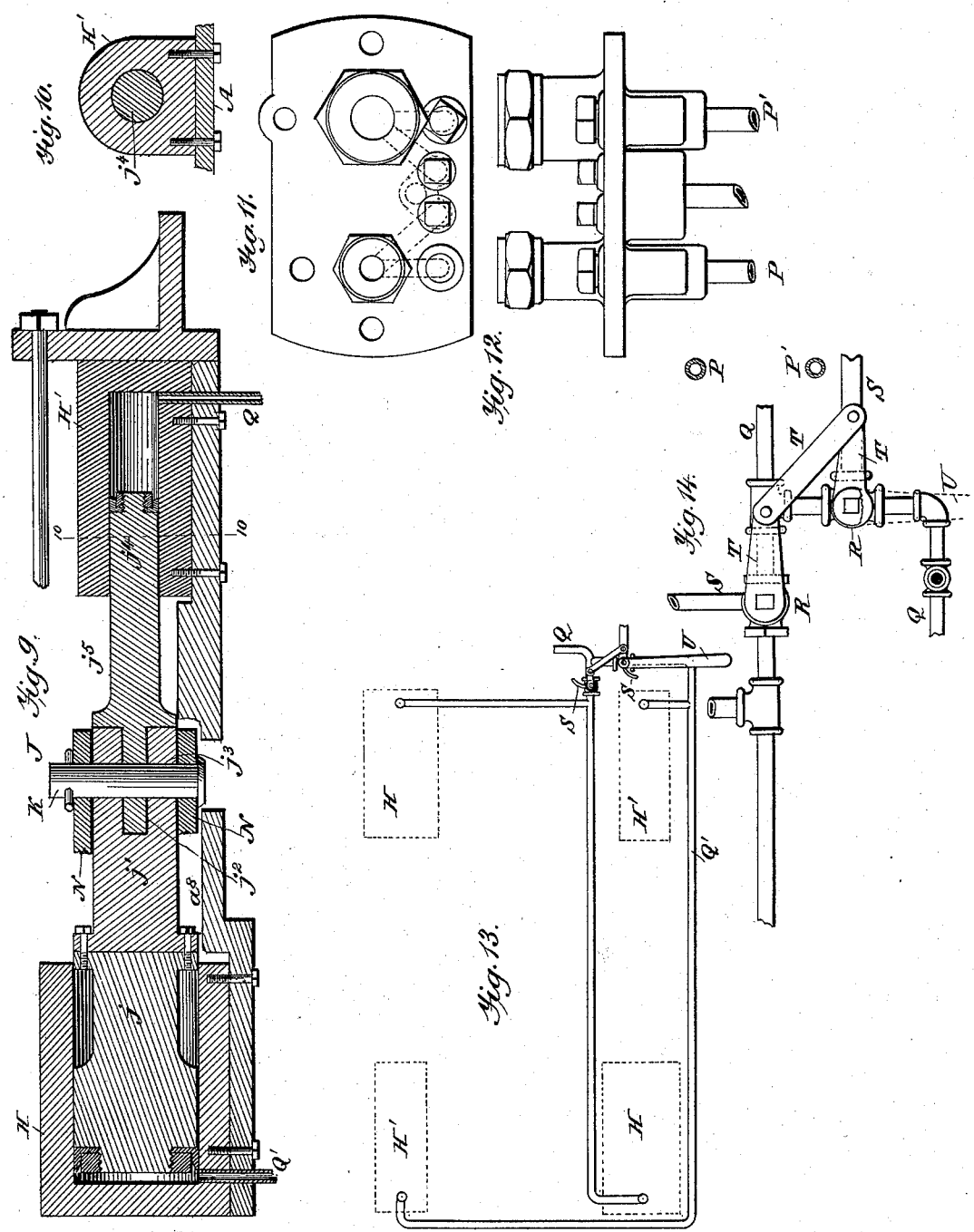
WITNESSES:
J. E. Luckett
Jos. A. Ryan
INVENTOR
Edward N. Zeller
BY
Fred G. Dieterich & Co.
ATTORNEYS

UNITED STATES PATENT OFFICE.

EDWARD N. ZELLER, OF PORTLAND, OREGON.

COLD-TIRE-SETTING MACHINE.

SPECIFICATION forming part of Letters Patent No. 585,997, dated July 6, 1897.

Application filed November 10, 1896. Serial No. 611,643. (No model.)

*To all whom it may concern:*

Be it known that I, EDWARD N. ZELLER, residing at Portland, in the county of Multnomah and State of Oregon, have invented a new and Improved Cold-Tire-Setting Machine, of which the following is a specification.

My invention is in the nature of a machine constructed to set tires when cold by means of pressure applied to the outer face thereof in such a manner as to cause the same to upset or shrink and assume a smaller diameter, and thus become firmly set or gripped upon the felly of the wheel.

The invention primarily has for its object to provide a machine of this character which will serve to act upon the tire at all points simultaneously and uniformly to equalize the pressure on the wheel and prevent warping of the felly on the wheel.

Another object of my invention is to provide a very simple but stable arrangement of parts whereby they can be readily assembled and repaired in case of breakage.

With various other objects in view, which will hereinafter be made clear, the invention consists in a cold-tire setting or shrinking machine embodying the novel arrangement and combination of parts, such as will be first described in detail, and then be specifically pointed out in the appended claims, reference being had to the accompanying drawings, in which—

Figure 1 is a perspective view of the simplest form of my invention, showing the same as applied for use. Fig. 2 is a top plan view of the same, parts being omitted to more clearly illustrate the same, the toggle and shifting devices being at their outer or normal position. Fig. 3 is a detail plan view of several of the toggle members, their presser-blocks, and the supplemental or filling blocks hereinafter referred to. Fig. 4 illustrates a modified arrangement of the toggle-operating means. Fig. 5 is a section, and Fig. 6 a plan view, of a further modification thereof. Fig. 7 is a detail side view of one of the toggle-arms and the supplemental slide or guide for the detachable filling-blocks. Fig. 8 illustrates several of the different-sized filling-blocks in plan view. Fig. 9 is a longitudinal section of one of the compound hydraulic cylinders and pistons. Fig. 10 is a transverse section thereof. Fig. 11 is a plan view, and Fig. 12 a side view, of a double-acting-pump mechanism employed for operating the several pistons. Fig. 13 is a diagrammatic view illustrating the arrangement of the feed-discharge pipes, their connections with the cylinders, the triple valve, and valve-operating devices. Fig. 14 is a detail view of a portion of such fluid-pipes and their valve connections. Figs. 15, 16, and 17 are detail sectional views taken on the lines 15, 16, and 17, respectively, on Fig. 2.

In the practical construction and in its simplest form my invention embodies a suitable bed-plate A, which is of cast metal, and to facilitate its being shipped in a compact form it may be of two or more sections joined by bolts in any approved manner. The bed-plate A, which is of suitable thickness, has a central opening $a$ for the reception of the wheel-hub, and a series of radial grooves B, which extend from the opening $a$ to an annular flange $a'$, which forms the internal bearing or guide for the friction-rollers $a^3$, which serve to facilitate the movement of the toggles.

By referring to Fig. 2 it will be seen the radial grooves B have enlarged or widened outer portions $b$, which terminate into narrow grooves $b'$, having undercut or dovetail portions $b^2$, for a purpose presently described.

C indicates a series of presser-blocks, one of which is shown in detail in Fig. 7, each of which has a socket $c$ and a dovetail tongue $c'$ on its outer face which is adapted to fit the dovetailed groove portion $b'$, they also having a pendent lug $c^2$, the purpose of which will presently appear.

D indicates a cast-iron rim which is held to turn on the depressed or outer annulus of the bed-plate, which rim has a series of (preferably thirty-six, as shown) sockets $d$ to receive the outer pivotal ends $f$ of the toggle members F, the inner ends $f'$ of which seat in the sockets $c$ of the presser-blocks C, as shown.

The rim D is held to turn on the bed-plate, and to give it the required strength and rigidity it is reinforced by a number (preferably three) of steel bands E E' E², shrunk on, so as to add strength to the rim sufficient to enable it to withstand any strain from within.

To provide for an easy movement of the rim

D on the bed-plate, such bed-plate has a series of pockets $a^6$, having friction-rollers $a^7$, as clearly shown in Figs. 2 and 5. When the several parts are joined in the manner shown in Figs. 1 and 2, their relative connection and arrangement are such that when at their normal or extended position the toggle-levers will be disposed at a slight tangent to the tire or wheel-rim and not radially thereto, as are the blocks C, such arrangement providing for a powerful and positive plunging or presser action of the blocks on the wheel-rim when the rim D is turned in the manner presently described to straighten the toggles and thereby force the blocks radially inward.

As all of the toggles are joined to the blocks C and the rim D in a uniform manner and as the blocks are guided to move radially inward, it follows that any rotary movement on the rim D will force the blocks C simultaneously inward to bear upon the wheel-tire, it being also manifest that while the said blocks are thus moved radially inward the tangent pressure exerted thereon by the toggle members will impart a substantially creeping or sidewise strain thereon and thereby cause the tire to shrink or upset in a more positive and uniform manner to grip the felly, such operation effecting a quicker shrinking action on the tire than can be obtained by imparting a direct radial action on the blocks C.

Instead of providing the rim D with a series of sockets $d$ to receive the outer ends of the toggles such rim may be provided with a series of integral camways $d^2$, having slideways $d^3$ to receive head socket-blocks $d^4$, in which the outer ends of the toggles are adapted to fit, as shown in Fig. 4, in which the toggles at the right are shown in their normal position—i. e., drawn outward—while the one at the left is shown at its inner position when forced up by the movement of the rim D in the direction indicated by the arrow.

In Figs. 5 and 6 is shown a further modification of the rim and the means for joining the toggles thereto. In this structure the rim has a series of circular wedge-blocks $d^5$, having the sockets $d^6$ arranged eccentrically, such blocks being held in semicircular seats in the rim D and connected by the plates $d^7$, so that when the rim D is turned the several blocks $d^5$ will be turned in their seats to force the toggles out.

To provide for the use of my upsetting mechanism for different-sized wheels having a diameter less than the diameter of the annular presser-rim formed by the blocks C, supplemental presser-blocks L are provided, which in practice are of different sizes, ranging from one to four inches width. These blocks, several of which are shown in Figs. 2 and 8, have dovetails adapted to fit in dovetail grooves in the supplemental guides M, adapted to fit the grooves B, as clearly shown in Fig. 2, and which have transverse sockets $m$ to receive the pendent studs $c^3$ on the head-blocks C, whereby such blocks M are moved with the blocks C. These supplemental blocks are used for different-sized wheels— that is, the first-sized block would be one inch, the second two inches, and the third block four inches wide, all of such blocks being used either singly or in combination to obtain the required impact or bearing-surface on the wheel-rim.

To provide a powerful and positive means for operating the toggles in unison and with a uniform pressure at all points, a duplicate set of hydraulically-operated pistons arranged at diametrically opposite sides of the main frame are provided, which are so disposed relatively to operate together and in reverse directions, whereby they will serve to move the annular band or cam-rim to an apply or a release position.

The hydraulically-operated pistons are in the nature of compound pistons, the construction thereof being clearly shown in Fig. 9, by reference to which it will be seen the same consists of a main cylinder H, preferably of eight inches bore, twelve inches deep, bolted fast to the bed-plate, and a small cylinder H', having a three-inch bore. Such cylinder is, however, more in the nature of a guide for one end of the piston J, it being, however, also used to receive the fluid-pressure for reversing the piston, which in practice is arranged to have a six-inch (more or less) movement, as the character of the work to be done may necessitate.

To facilitate the ready connection or disconnecting of the several parts constituting the piston without disarranging the fluid-pipes presently described, the said piston is formed of three sections, a head $j$, which operates in the large cylinder, provided with a rod portion $j'$, having a bifurcated end $j^2$, apertured, as at $j^3$, a second head $j^4$, which operates in the small cylinder H', which has a rod portion $j^5$, terminating in an apertured shank, adapted to fit the bifurcated end of the rod $j^2$, and a strong steel pin K, which joins the two rod-sections of the piston and which forms the pull-pin for a pair of clevises or pull-links N, as clearly shown, such links N being also connected to the pull-pins O O, which pass down through thickened portions of the rim or band D at diametrically opposite points thereof. The pistons at one side are flattened, so that when pressure is on they will bear against the outer band of the movable rim and in a measure overcome some of the strain thereon. Each piston-head has suitable packing, as shown.

At the points where the hydraulic cylinders are set the bed-plate is suitably depressed or cut away, as at $a^8$, (see Fig. 2,) to permit of a free movement of the link or clevis members hereinbefore referred to.

In the simplest form a single-pump-operated means (see Fig. 1) may be used for forcing the fluid under pressure to the cylinders and drawing off the same. I prefer, however, to employ a double-pump mechanism—such, for example, as shown in Figs. 11 and 12—such mechanism having a large pump for forcing the fluid into the large cylinders and a smaller pump for like service for the small cylinders, the suction-pipes P P' of such pumps being connected, respectively, with the feed-pipes Q and Q', one of which, Q, connects with the large cylinders H, while the other, Q', connects with the small cylinders H', the said pipes having each a triple reversing-valve mechanism R R and waste-pipes S S, the construction of which is best shown in Figs. 13 and 14, such valve R R being joined by link members T T with a single operating-lever U. The feed-pipes in practice may be also provided with suitable check-valves. The manner in which my invention is operated is best explained as follows: After the wheel is set in place and held in any approved manner and the tire loosely slipped thereon the several blocks and toggles are set to their normal position. Power is then applied by operating the large pump to force the fluid under pressure into the large cylinders, the several valves being so set that at this time the fluid in the small cylinders will be drawn out through the pipe connected therewith through the valve and out of the escape-section into a suitable collecting-pan W, (see Fig. 1,) with which the pump connects, until the piston has been forced out the required distance. The hand-lever is then adjusted to reverse the piston of the several valves in the fluid-pipes and the small pump operated to force the fluid into the small cylinders and allow for the escape of the fluid in the large cylinders, which will cause the piston, the rim D, and the toggles and presser-blocks to assume their normal position.

While I have shown and described my invention as adapted for shrinking wagon-wheel tires, it is obvious that the same can be adapted for setting tires on other wheels, such as locomotive-engine wheels, which can be accomplished by making the machine larger and more powerful. It may also be used in any and every case where the shrinkage of iron might be accomplished by the use thereof.

While I have shown hydraulic-pump devices for operating the rim D, it is manifest other means may be used for such purpose. Furthermore, changes and modifications of the several parts may be made without departing from the spirit of my invention.

Having thus described my invention, what I claim, and desire to secure by Letters Patent, is—

1. A cold-tire-setting machine comprising a bed-plate, a series of radially-movable presser-blocks, an annular rim movable on the bed-plate, a series of toggle-arms connecting the rim and the presser members and a fluid-pressure mechanism for imparting a direct partial rotation to the rim substantially in the manner shown and for the purposes described.

2. In a tire-setter mechanism, the combination with the bed-plate the radially-movable pressers, the toggle members connected thereto, a rotatable rim for moving the toggles simultaneously and a fluid-pressure means for operating the rim as set forth.

3. The combination of the bed-frame having a central opening and radial guides, presser-blocks movable in such guides, the rotatable rim, the reinforce-bands held thereon, the toggles pivotally connected with the rim and the presser-blocks, the fluid-pressure-operated pistons and the link members joining the pistons and rotatable rim all arranged substantially as shown and for the purposes described.

4. In a cold-tire-setting mechanism, the combination with the bed-plate, having a series of radial grooves, presser-blocks movable therein, an annular rim, having a rotary movement on the bed-plate, a series of toggles pivotally connected to the said rim and to the presser-blocks, fluid-pressure devices connected to the said rim and the supplemental presser-blocks L, all substantially as shown and for the purposes described.

5. In a cold-tire-setting mechanism the combination with the bed-plate having radially-disposed guide-grooves, the presser-blocks movable therein and the toggles, and movable rim of the cylinders H H' the pistons formed of three sections the link-arms connecting the pistons and the toggle members and the fluid-pressure mechanism substantially as described.

6. A cold-tire-setting machine comprising a bed-plate or supporting-frame, radially-movable presser-blocks, a rim having a limited rotation in a fixed manner on the frame, and having a series of cam members, one for each presser-block, a series of arms held to bear with one end against the presser-blocks and with the other against the cams on the rim, said arms being normally held at a tangent to the rim, and means for moving the rim substantially as and for the purposes described.

7. The combination with the bed-frame, the presser-blocks the toggles and the movable rim, of the cylinders H and H' the piston, said piston being flattened at the side adjacent the rim, and the fluid-pressure mechanism for operating the piston all substantially as shown and for the purposes described.

8. In a machine as described the combination with the radially-movable pressers, and the means for forcing them simultaneously inward, of the cylinders the pistons the link-arms connecting the pistons with the presser-operating means and the double-acting-pump mechanism having reversing-valve-lever devices and suitable connections with the cylinders substantially as shown and described.

9. The combination with the frame, the radially-movable presser-blocks, and means for forcing such blocks inward, supplemental presser-blocks adapted to be detachably held in front of the movable presser-blocks substantially as shown and for the purposes described.

10. The combination with the frame, having radial grooves, the main presser-blocks mounted therein, and means for forcing such blocks inward, of the supplemental guides M, and the supplemental presser-blocks L, substantially as set forth.

11. The combination of a bed-plate, a series of presser-blocks, radially movable thereon, an annular rim movable in a circle about the presser-blocks, said rim having a series of cam-seats, guides movable thereon, and toggles pivotally connected at the front end to the presser-blocks, and at the outer ends to the cam-guides, and means for rotating the rim in reverse directions as specified.

12. A tire-setting machine, comprising a bed-plate, having a central opening for the wheel-hub, a series of presser-blocks radially movable toward such opening, an annular rim having rotatable movement on the bed-plate, means for partially rotating such rim, and connections operated by the rotary movement of the rim adapted to move the presser-blocks inward and outward substantially as shown and for the purposes described.

EDWARD N. ZELLER.

Witnesses:
J. ALFRED MARSH,
A. J. HENRY.